United States Patent
Trujillo et al.

(10) Patent No.: US 9,331,413 B2
(45) Date of Patent: May 3, 2016

(54) DUAL THICKNESS DOUBLE-ENDED MALE BLADE TERMINAL

(71) Applicant: DELPHI TECHNOLOGIES, INC., Troy, MI (US)

(72) Inventors: Priscilla R. Trujillo, Troy, MI (US); Adrian Flores, Chihuahua (MX); Jesus R. Morales, Chihuahua (MX); Christopher Alan Brandon, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/321,922

(22) Filed: Jul. 2, 2014

(65) Prior Publication Data

US 2016/0006155 A1    Jan. 7, 2016

(51) Int. Cl.
| | |
|---|---|
| *H05K 1/00* | (2006.01) |
| *H01R 13/04* | (2006.01) |
| *H01R 12/58* | (2011.01) |
| *H01R 43/16* | (2006.01) |
| *B60R 16/023* | (2006.01) |
| *H01R 13/05* | (2006.01) |

(52) U.S. Cl.
CPC .............. *H01R 13/04* (2013.01); *H01R 12/58* (2013.01); *H01R 12/585* (2013.01); *H01R 43/16* (2013.01); *B60R 16/0238* (2013.01); *H01R 13/055* (2013.01)

(58) Field of Classification Search
CPC ........ H01R 13/04; H01R 13/15; H01R 13/20; H01R 43/16

USPC .............. 439/78, 76.2, 76.1, 75, 620.33, 845, 439/849, 850; 361/760, 627, 641, 642, 826
See application file for complete search history.

(56) References Cited

U.S. PATENT DOCUMENTS

| | | | | |
|---|---|---|---|---|
| 2,130,424 | A * | 9/1938 | Grant | 439/692 |
| 2,752,580 | A | 6/1956 | Shewmaker | |
| 2,811,702 | A | 10/1957 | Narozny | |
| 3,977,075 | A * | 8/1976 | Lynch et al. | 29/830 |
| 4,923,414 | A | 5/1990 | Sitzler | |
| 5,023,752 | A * | 6/1991 | Detter et al. | 361/752 |
| 5,046,960 | A * | 9/1991 | Fedder | 439/108 |
| 5,582,519 | A * | 12/1996 | Buchter | 439/101 |
| 5,831,814 | A | 11/1998 | Hamill | |
| 6,008,982 | A * | 12/1999 | Smith | 361/624 |
| 6,062,916 | A * | 5/2000 | Gladd et al. | 439/751 |
| 6,690,582 | B2 * | 2/2004 | Sumida | 361/752 |
| 8,070,535 | B2 * | 12/2011 | Goto | 439/876 |
| 2012/0268864 | A1 | 10/2012 | Borowicz et al. | |
| 2013/0052861 | A1 | 2/2013 | Niitsu et al. | |
| 2013/0330949 | A1 * | 12/2013 | Ferran Palau et al. | 439/250 |

\* cited by examiner

*Primary Examiner* — Amy Cohen Johnson
*Assistant Examiner* — Milagros Jeancharles
(74) *Attorney, Agent, or Firm* — Robert J. Myers

(57) ABSTRACT

A printed circuit board (PCB) assembly having a double-ended male blade electrical terminal is presented. The double-ended terminal has a first blade with a substantially uniform first thickness and a second blade opposite the first blade that has an embossed mesial region providing a substantially uniform second thickness, wherein the effective thickness of the second blade is greater than the thickness of the first blade. The terminal may be used in an electrical center of a motor vehicle to interconnect a female socket in a vehicle wiring harness to an electronic device, such as a fuse or relay, having a socket terminal that is mounted on the PCB. A method of manufacturing such as double ended-terminal is also presented.

20 Claims, 5 Drawing Sheets

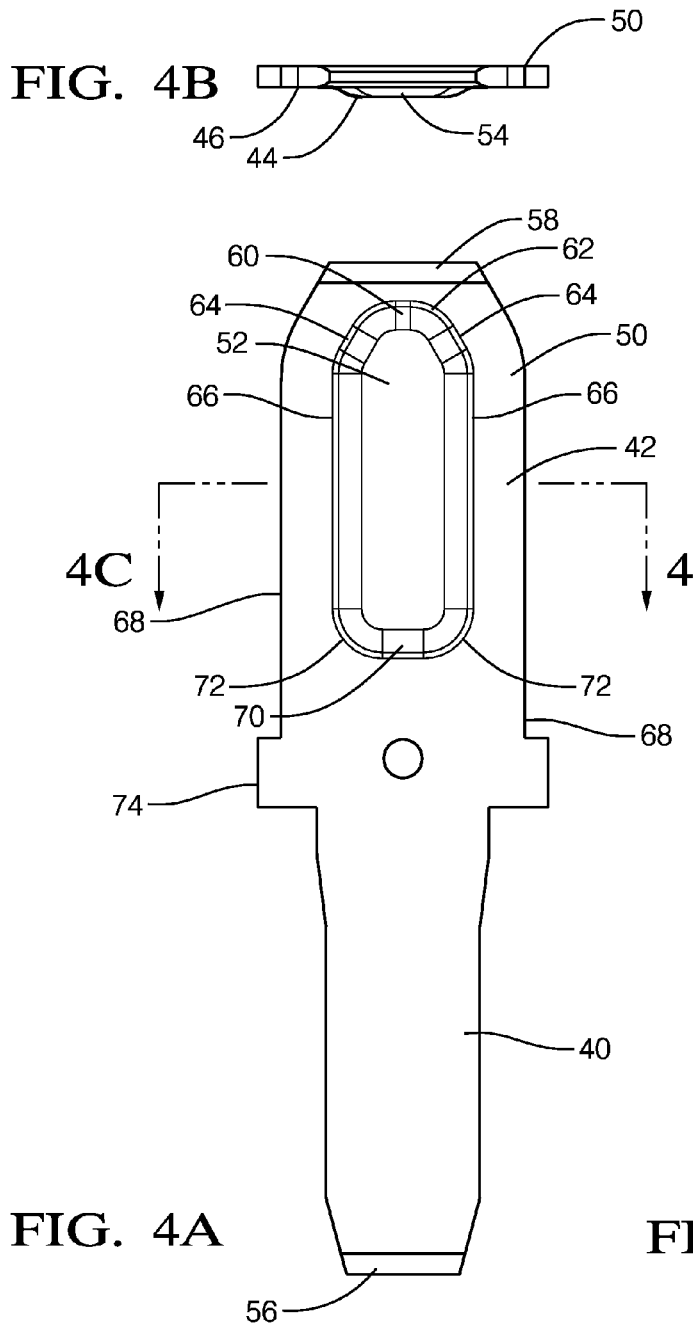
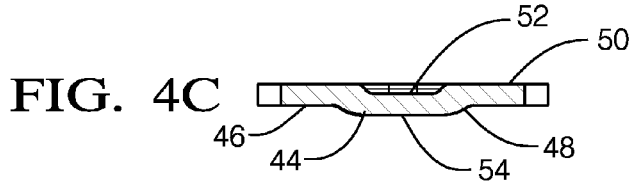
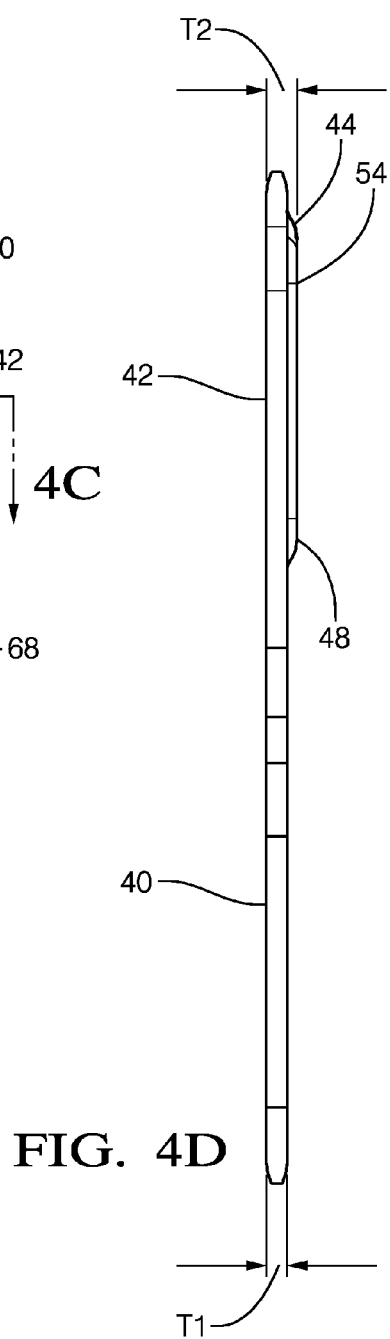
FIG. 4B
FIG. 4A
FIG. 4C
FIG. 4D

DUAL THICKNESS DOUBLE-ENDED MALE BLADE TERMINAL

TECHNICAL FIELD OF THE INVENTION

The invention generally relates to electrical terminals, and more particularly relates to a double ended male blade terminal having one blade with a different thickness than the other blade.

BACKGROUND OF THE INVENTION

Electrical centers are used in motor vehicles to interconnect various electrical circuits. The electrical center includes a number of electrical wiring harness connectors that connect the vehicle wiring with circuit switching devices, such as relays, and circuit protection devices, such as fuses.

Printed circuit boards (PCB) are used to mechanically support and electrically connect electronic components thru pathways/traces of copper connected to metal terminals that provide the connection to the various functions and locations via cables. PCB terminals are used as a mechanical support of electronic devices (e.g., fuses and relays) and electrical connections between the devices and the wiring harness connectors. Typically, the electrical centers are designed so that the wiring harness connectors are grouped on one side of the PCB while the electronic devices are grouped on the other.

PCBs are typically purchased as a laminate material with copper already applied to both sides; the unwanted copper is removed by various methods leaving only the desired copper traces. To accommodate circuits of different current carry capability, it may be desirable to use several PCBs with varying copper thickness to economically build a compact 3-dimensional electrical center or a similar component.

There are many PCB terminals designed with different thicknesses and width dependent upon the electrical component mating to it as well as the current carrying capacity required. All electronic devices (fuses, relays, etc.) are designed with a specific mating terminal thickness (tuning fork/female terminal or male blade) as a standard. Some of these electronic devices terminals range from 0.8 millimeters (mm) to 1.2 mm thick stock metal material. When the electronic device requires a certain thickness blade and the output female socket terminal connecting to the wire that supplies the connection to the function needs a different thickness than the electronic device, typically two separate terminals are placed in the PCB and are connected by a conductive trace. This requires space on the PCB and may increase number of PCB layers needed, thereby increasing manufacturing assembly time and cost, the number of terminals, materials (e.g. solder paste and/or conformal coating) and possibly increasing the dimensions of the electrical center.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a double-ended male blade electrical terminal is provided. The double-ended male blade electrical terminal includes a first blade characterized by a substantially uniform first thickness and a second blade having an embossed mesial region that characterizes a substantially uniform second thickness, wherein the second thickness is greater than the first thickness. According to one particular embodiment, the first thickness is about 0.8 millimeters and the second thickness is about 1.2 millimeters. One side of the first blade and one side of the second blade may be substantially coplanar. The electrical terminal may define a shoulder intermediate the first blade and the second blade. This shoulder has a shoulder width that is greater than a first blade width and a second blade width.

A first distal end of the first blade and a second distal end of the second blade may be beveled. A leading end of the embossed region proximate the second distal end defines a rounded isosceles triangle shape, sides of the embossed region are substantially parallel to sides of the second blade and a trailing end of the embossed region is characterized as having rounded corners. According to a particular embodiment of the electrical terminal, two sides of the leading end of the embossed region define a 30 degree angle relative to a longitudinal axis of the electrical terminal and the second blade width is greater than the first blade width.

In another embodiment of the present invention, a printed circuit board (PCB) assembly is provided. The PCB assembly includes a dielectric substrate, a conductive trace disposed upon a surface of the substrate, and a double-ended male blade electrical terminal disposed within an aperture defined by the substrate. The electrical terminal has a first blade characterized by a substantially uniform first thickness and a second blade having an embossed mesial region that characterizes a substantially uniform second thickness, wherein the second thickness is greater than the first thickness. The electrical terminal may not be in intimate contact with said conductive trace. The first blade protrudes from a first surface of the substrate and the second blade protrudes from a second surface of the substrate opposite the first surface. The second blade is configured to be connected to a corresponding socket terminal within an electrical connector while the first blade is configured to be connected to a corresponding socket terminal within an electrical device. According to one embodiment of the PCB assembly the electrical device includes a fusible link and according to another embodiment the electrical device includes an electromechanical relay.

In yet another embodiment of the present invention, a method of manufacturing a double-ended male blade electrical terminal having a first blade characterized by a substantially uniform first thickness and a second blade characterized by a substantially uniform second thickness, wherein the second thickness is greater than the first thickness is provided. The method includes the steps of forming the double-ended male blade electrical terminal from a sheet of conductive material having the substantially uniform first thickness; and embossing a mesial region of the second blade so that the mesial region is characterized by the substantially uniform second thickness. One side of the first blade and one side of the second blade may be substantially coplanar. The electrical terminal may formed to define a shoulder intermediate the first blade and the second blade, said shoulder having a shoulder width that is greater than a first blade width and a second blade width. According to one particular embodiment, the conductive sheet has first thickness of about 0.8 millimeters and the mesial region is embossed to a second thickness of about 1.2 millimeters.

The method may further include the step of beveling a first distal end of the first blade and a second distal end of the second blade. A leading end of the embossed region proximate the second distal end may be embossed to define a rounded isosceles triangle shape. A trailing end of the embossed region may be embossed to form a pair of rounded corners. The sides of the embossed region may be substantially parallel to sides of the second blade. Two sides of the leading end of the embossed region may be embossed to define a 30 degree angle relative to a longitudinal axis of the electrical terminal. According to one particular embodiment, electrical terminal is formed so that the second blade width is greater than the first blade width.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 4A is view of the double-ended male blade electrical terminal of FIG. 3 in accordance with one embodiment;

FIG. 4B is end view of the double-ended male blade electrical terminal of FIG. 3 in accordance with one embodiment;

FIG. 4C is cross sectional view of the double-ended male blade electrical terminal of FIG. 3 in accordance with one embodiment; and FIG. 4D is side view of the double-ended male blade electrical terminal of FIG. 3 in accordance with one embodiment;

DETAILED DESCRIPTION OF THE INVENTION

A double-ended male blade electrical terminal is presented herein. The terminal has two terminal blades with different effective thickness. The electrical terminal is suited for use in the printed circuit board of a vehicle's electrical center. A first blade of the terminal having a first thickness may be used to connect to a mating socket connector of the vehicle's wiring harness on one side of the PCB while a second blade having the different second thickness on the other side of the PCB may plug directly into the socket connector of an electrical device such as a fuse of a relay. This terminal eliminates the need for two separate blade terminals with different thickness and reduces the PCB real estate and conductive traces required to mount and connect them.

Figure 1:
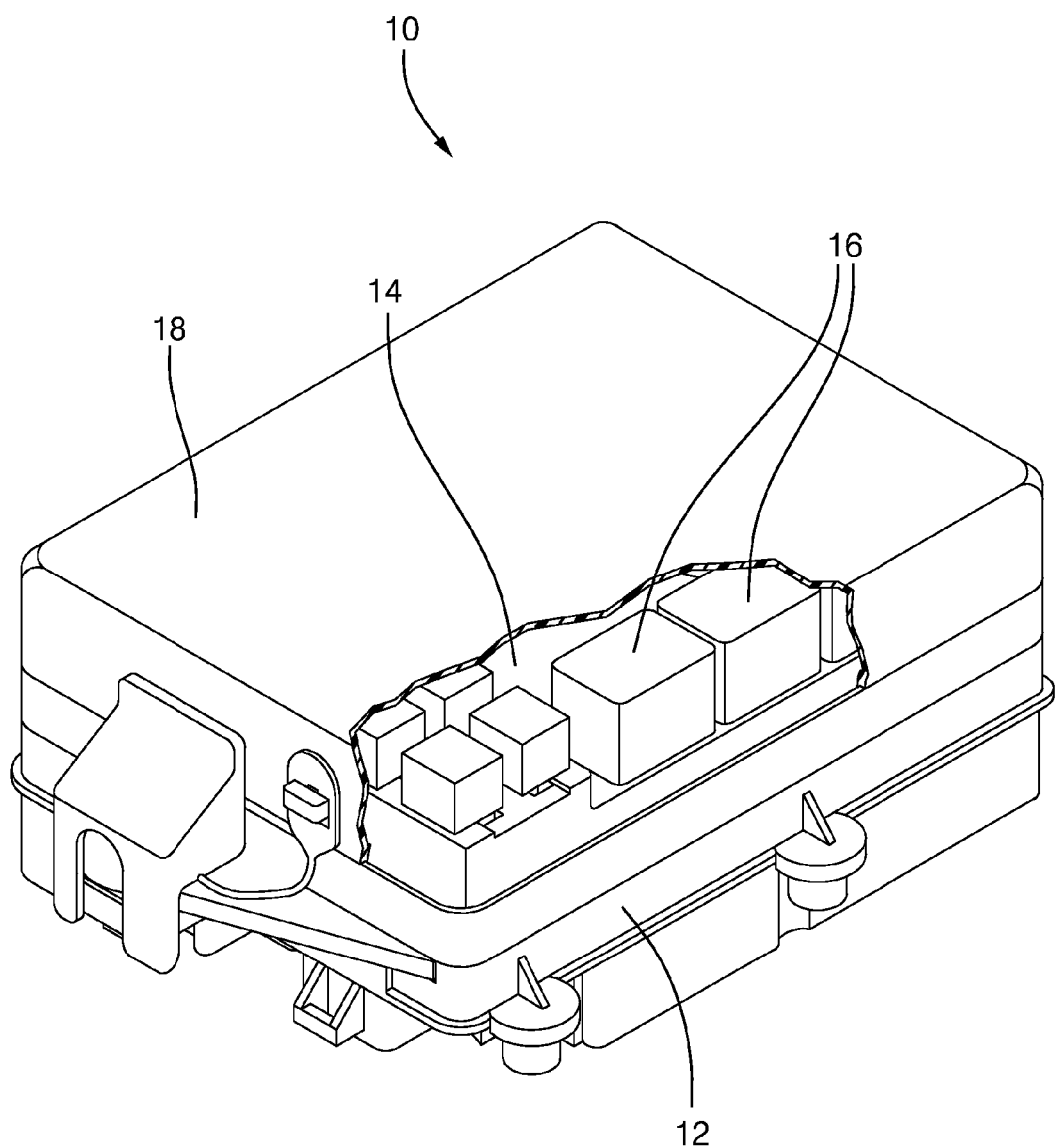
FIG. 1 is cut-away perspective view of an electrical center in accordance with one embodiment.

FIG. 1 illustrates a non-limiting example of an electrical center 10 configured for use in a motor vehicle (not shown). The electrical center includes a housing 12 containing a printed circuit board (PCB) assembly 14. The PCB assembly 14 contains conductive traces (not shown) configured to connect electronic devices 16, such as a relay or fuse, and electrical terminals (not shown) which may or may not be connected to the conductive traces. The PCB may be made from epoxy or polyimide resins. The resin may be reinforced with a woven glass cloth or other matrix such as chopped fibers. PCBs formed of such materials are typically called FR-4 or G-10 type circuit boards. The PCB may alternately be constructed of ceramic or rigid polymers. This listing of acceptable PCB materials is not exhaustive and other materials may also be used successfully. The materials and manufacturing techniques used to form printed circuit boards are well known to those skilled in the art. The electrical center also includes a cover 18 that can be removed top allow access to the electronic devices as may be required for installation and service of the electronic devices. The electronic devices are located on one side 20 of the PCB while the electrical terminals configured to interconnect the electrical center 10 to the vehicle's wiring harness connectors are located on the opposite side 22 of the PCB.

Figure 2:
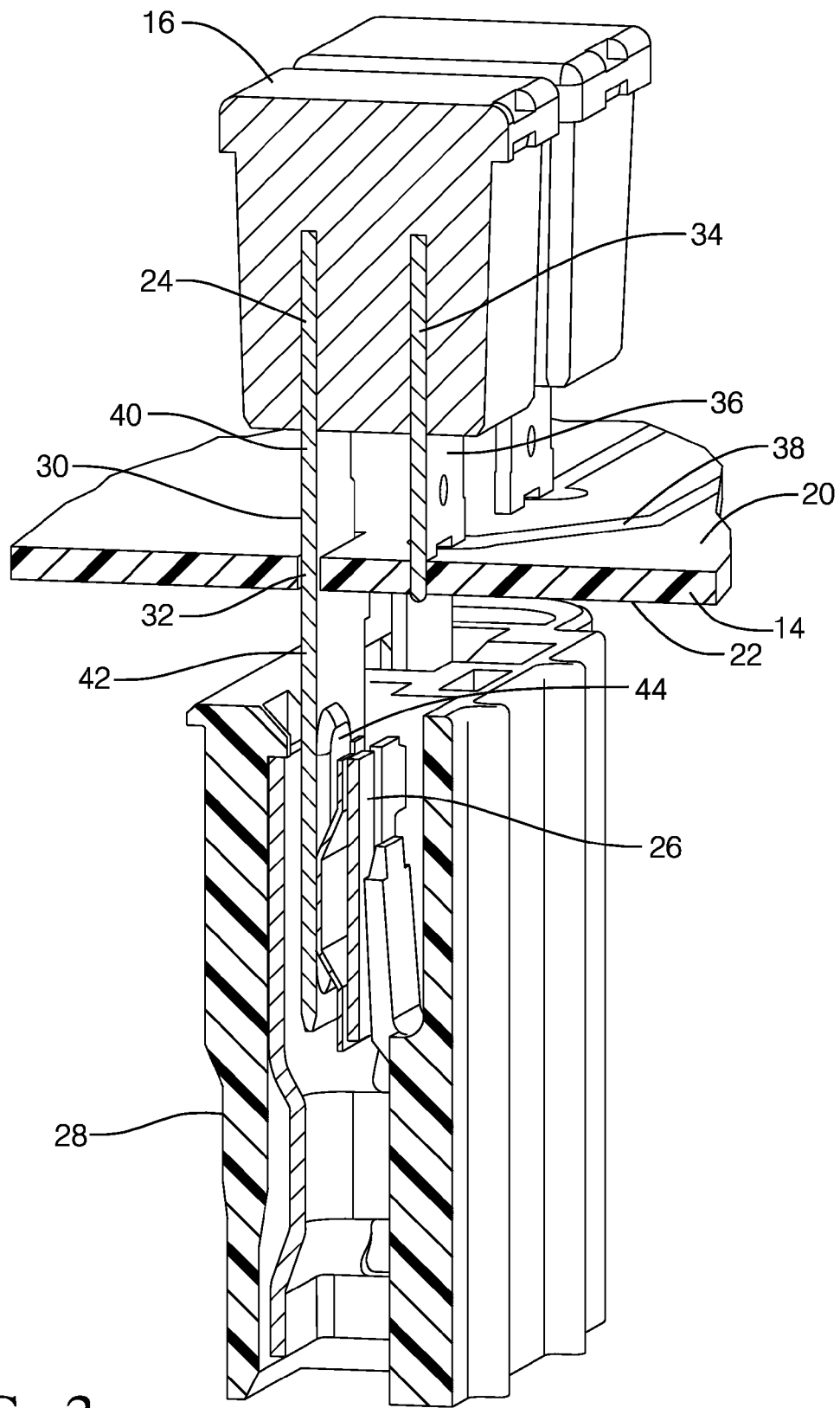
FIG. 2 is a cut-away view of a printed circuit board (PCB) assembly of the electrical center of FIG. 1 in accordance with one embodiment.

FIG. 2 illustrates non-limiting example of the PCB assembly 14 in a cut-away view wherein an electronic device 16, such as a fuse, having a first female socket terminal 24 is directly connected to another female socket terminal 26 in a wiring harness connector 28 by a double-ended male blade terminal 30 mounted though an aperture 32 or "via" in the PCB. A first blade 40 protrudes from a first surface 20 of the PCB and the second blade 42 protrudes from a second surface 22 of the PCB opposite the first surface 20. A second socket terminal 34 of the electronic device 16 is connected to a single-ended male blade terminal 36 that is mounted on the first surface 20 of the PCB. Both the double-ended male blade terminal 30 and the single-ended male blade terminal 36 are formed of a conductive material, such as copper alloys, brass, or beryllium copper. The double-ended terminal 30 and single-ended terminal 36 may be plated, for example with a tin-based alloy, to provide corrosion resistance. In example illustrated in FIG. 2, the double-ended terminal 30 is not connected to a PCB trace while the single-ended terminal 36 is connected to a PCB trace 38. Alternative embodiments of the PCB assembly may be envisioned wherein the double-ended male blade terminal is connected to a conductive trace on the PCB.

As shown in FIG. 4D, the first blade 40 of the double-ended terminal 30 connected to the first female socket terminal 24 of the electronic device 16 has a substantially uniform first thickness T1, according to the illustrated example about 0.8 mm (0.8+0.052/−0.000 mm). As used herein, a substantially uniform thickness is ±0.026 mm The second blade 42 of the double-ended terminal 30 configured to be connected to the female socket terminal 26 in a wiring harness connector 28 has region 44 in the central, or mesial, portion of the second blade 42 wherein the second blade 42 is embossed or raised from the surrounding material of the second blade 42. This embossed region 44 increases the effective thickness of the second blade 42 to a substantially uniform second thickness T2, according to the illustrated example about 1.2 mm (1.2±0.026 mm), which is greater than the first thickness T1. As used herein, embossed means that the second blade 42 is deformed by punch, die, or other metal deforming process so that a first side 46 of the second blade 42 has a protruded region 48 while a second side 50 opposite the first side 46 defines a corresponding indented region 52.

As best illustrated in FIGS. 4B and 4C, the embossed region 44 contains a planar portion 54 that is substantially parallel to the first side 46 and the second side 50 of the second blade 42. As used herein, substantially parallel means that the planar portion 54 is ±10° of being absolutely parallel. A second side of the first blade 40 is substantially coplanar with the second side of the second blade 42. As used herein, substantially coplanar means that the second side of the first blade 40 is ±5° and ±0.5 mm of being absolutely coplanar. The second thickness T2 is the distance from the first side of the second blade 42 to the planar portion 54 of the embossed region 44. The embossed region 44 is substantially non-compliant and is continuously attached to the second blade 42. As used herein, substantially non-compliant means that the embossed region 44 will not deform under forces exerted on it by the mating socket connector in normal operation. The embossed region 44 is not characterized as an arcuate fixed beam or a cantilevered beam. The embossed region 44 is not configured to exert a spring force against the corresponding mating socket terminal 26; rather the corresponding mating socket terminal 26 is configured to exert a spring force against the second blade 42, including the embossed region 44.

As best shown in FIGS. 4A and 4D, a first distal end 56 at the tip of the first blade 40 and a second distal end 58 at the tip of the second blade 42 are beveled, that is angled, so as to reduce the thickness T1 and the width W1, W2 of the blades 40, 42 to facilitate insertion of the blades 40, 42 into the corresponding mating socket terminals 24, 26.

As shown in FIG. 4A, a leading end 60 of the embossed region 44 that is proximate, or nearest to, the second distal end 58 of the second blade 42 defines a rounded isosceles triangle shape 62. In the illustrated example, two sides 64 of the leading end 60 of the embossed region 44 define a 30 degree angle relative to a longitudinal axis A of the double-ended terminal 30. The triangular shape 62 of the leading end 60 facilitates insertion of the second blade 42 into the corresponding mating socket terminal 26. The sides 66 of the embossed region 44 are substantially parallel to the sides 68 of the second blade 42. A trailing end 70 of the embossed region 44 is characterized as having rounded corners 72. The rounded corners 72 of the trailing end 70 facilitate removal of the second blade 42 from the corresponding mating socket terminal 26 during disconnection.

Figure 3:
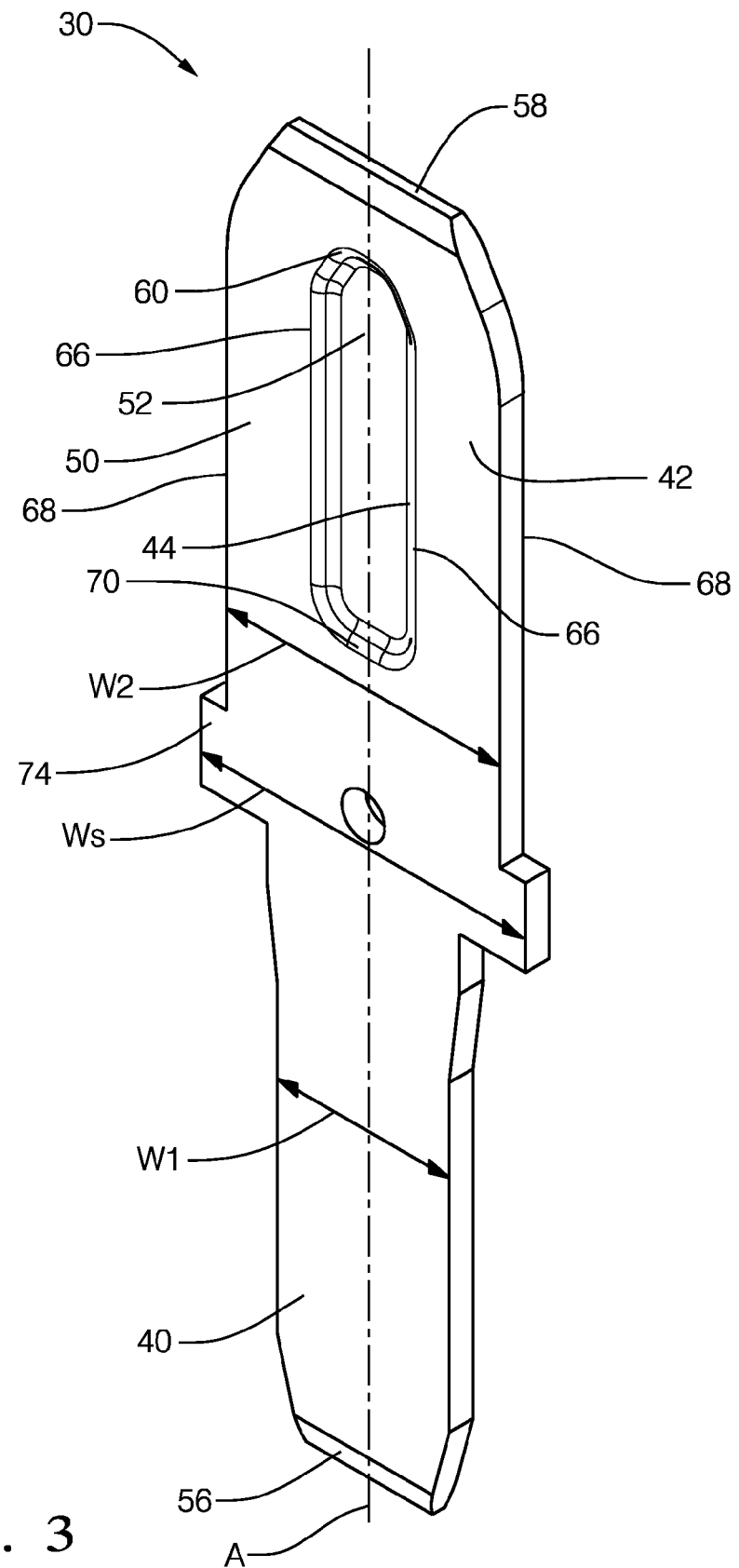
FIG. 3 is a perspective view of a double-ended male blade electrical terminal of the printed circuit board (PCB) assembly of FIG. 2 in accordance with one embodiment.

Returning now to FIG. 3, the double-ended terminal 30 defines a shoulder 74 intermediate the first blade 40 and the second blade 42. This shoulder 74 has a shoulder 74 width Ws that is greater than a first blade 40 width W1 and a second blade 42 width W2. According to the illustrated example, the second blade 42 width W2 is greater than the first blade 40 width W1. Alternatively, the shoulder may be defined by the wider of the first or second blades. Alternative embodiments of the electrical terminal may have a first blade that is wider than a second blade having an embossed region to increase thickness of the second blade or may have a first blade with the same width as a second blade. The shoulder 74 may be mechanically and/or electrically attached to a copper pad on the PCB surrounding the aperture 32 by a soldering process.

Figure 5:
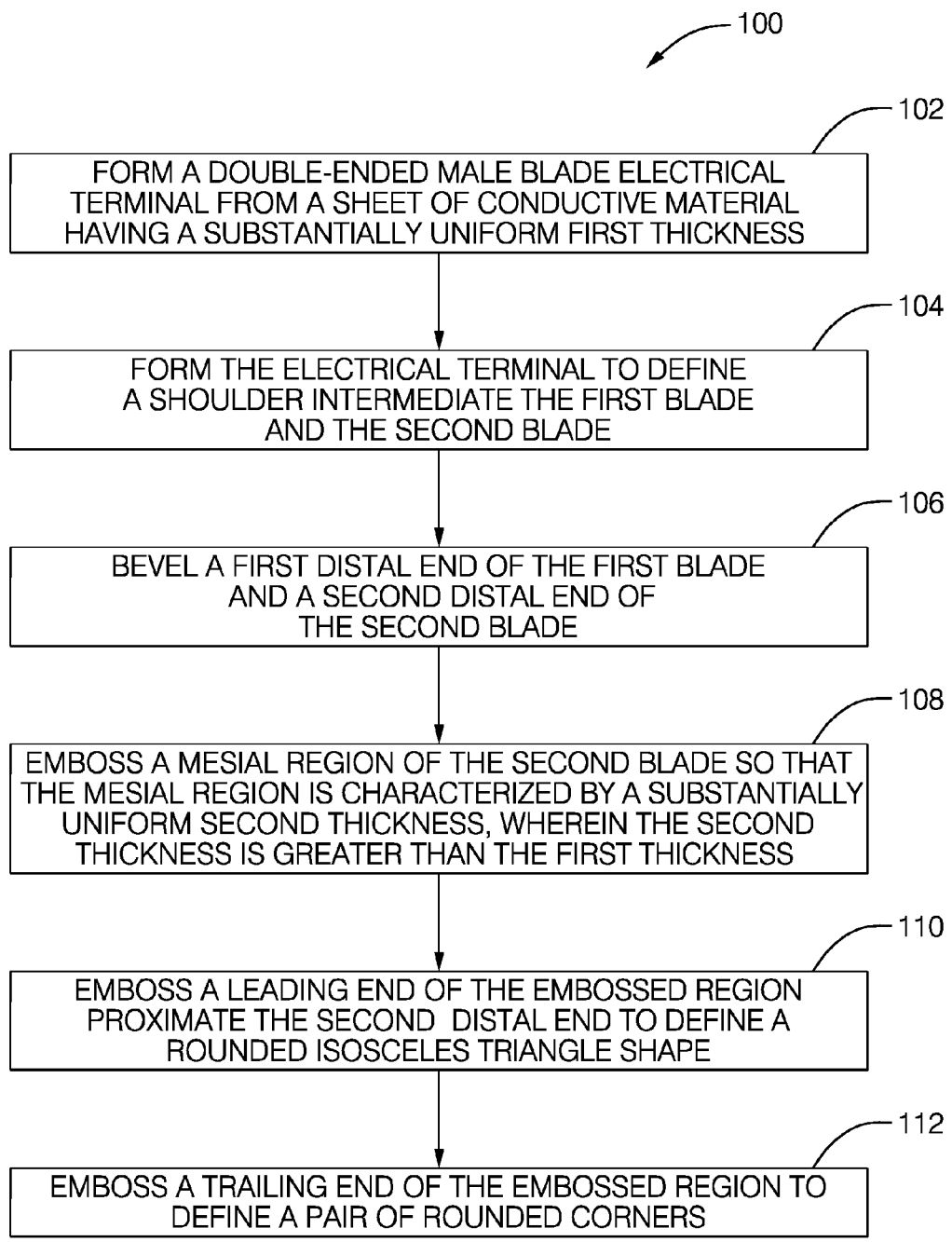
FIG. 5 is a flow chart of a method of manufacturing a double-ended male blade electrical terminal in accordance with another embodiment.

FIG. 5 illustrates a non-limiting example of a method 100 of manufacturing a double-ended male blade electrical terminal 30 having a first blade 40 with a substantially uniform first thickness T1 and a second blade 42 characterized by a substantially uniform second thickness T2, wherein the effective thickness of the second blade 42 is greater than the thickness of the first blade 40. The method 100 includes the following steps:

STEP 102, FORM A DOUBLE-ENDED MALE BLADE ELECTRICAL TERMINAL FROM A SHEET OF CONDUCTIVE MATERIAL HAVING A SUBSTANTIALLY UNIFORM FIRST THICKNESS, includes forming the double-ended terminal 30 from a sheet of conductive material having the substantially uniform first thickness T1. The double-ended terminal 30 may be formed from a sheet of a conductive material, such as copper alloys, brass, or beryllium copper. The double-ended terminal 30 may be formed by cutting, stamping, fine blanking, or any other method of forming a terminal blank from a sheet of conductive material known to those skilled in the art. According to one particular embodiment the first thickness T1 of the sheet is about 0.8 mm (0.8+0.052/−0.0 mm). The second blade width W2 may be greater than the first blade width W1 and one side of the first blade 40 and one side of the second blade 42 may be substantially coplanar.

STEP 104, FORM THE ELECTRICAL TERMINAL TO DEFINE A SHOULDER INTERMEDIATE THE FIRST BLADE AND THE SECOND BLADE, is an optional step that includes forming the double-ended electrical terminal 30 to define a shoulder 74 intermediate the first blade 40 and the second blade 42, wherein the shoulder 74 has a width Ws that is greater than a first blade width W1 and a second blade width W2.

STEP 106, BEVEL A FIRST DISTAL END OF THE FIRST BLADE AND A SECOND DISTAL END OF THE SECOND BLADE, is an optional step that includes beveling a first distal end 56 on the tip of the first blade 40 and a second distal end 58 on the tip of the second blade 42.

STEP 108, EMBOSS A MESIAL REGION OF THE SECOND BLADE SO THAT THE MESIAL REGION IS CHARACTERIZED BY A SUBSTANTIALLY UNIFORM SECOND THICKNESS, WHEREIN THE SECOND THICKNESS IS GREATER THAN THE FIRST THICKNESS includes embossing a central mesial region 44 of the second blade 42 so that the embossed mesial region 44 is characterized by the substantially uniform second thickness. The embossed region 44 may be formed using conventional embossing methods such as a punch and die. According to one particular embodiment, the embossed region 44 provides a second thickness is about 1.2 mm (1.2±0.026 mm) from a second side of the second blade 42 to a planar portion 54 of the embossed region 44.

STEP 110, EMBOSS A LEADING END OF THE EMBOSSED REGION PROXIMATE THE SECOND DISTAL END TO DEFINE A ROUNDED ISOSCELES TRIANGLE SHAPE, includes embossing a leading end 60 of the embossed region 44 proximate the second distal end 58 to define a rounded isosceles triangle shape 62. According to one particular embodiment, two sides 64 of the leading end 60 of the embossed region 44 define a 30 degree angle relative to a longitudinal axis A of the double-ended terminal 30.

STEP 112, EMBOSS A TRAILING END OF THE EMBOSSED REGION TO DEFINE A PAIR OF ROUNDED CORNERS, includes embossing a trailing end 70 of the embossed region 44 to define a pair of rounded corners 72, wherein the sides 66 of the embossed region 44 are substantially parallel to the sides 68 of the second blade 42.

While the examples of the double-ended male blade terminal are illustrated within a PCB assembly that is part of a vehicle electrical center, other embodiments of the double-ended male blade terminal made be envisioned wherein the PCB is used in applications other than a vehicle electrical center or wherein the double-ended male blade terminal is used to directly connect two corresponding socket connectors without a PCB.

Accordingly, a PCB assembly 14, a double-ended male blade electrical terminal 30, and a method 100 of manufacturing such a terminal are provided. The double-ended terminal 30 of the PCB assembly 14 provides the benefit of directly connecting a female socket terminal 26 in a wiring harness connector 28 to a female socket terminal 24 in an electronic device 16 of the PCB assembly 14, such as a fuse or relay, wherein the female socket terminal 26 of the wiring harness connector 28 requires a different male blade terminal thickness than the socket terminal of the electrical device. The double-ended terminal 30 does not require as much "real estate", i.e. space on the surfaces 20, 22 of the PCB assembly 14 as two separate male blade terminals mounted on each side of the PCB and does not require a conductive trace on the PCB in order to interconnect the female socket terminal 26 of the wiring harness connector 28 to the electronic device 16. The method 100 of manufacturing the double-ended terminal 30 provides the benefit of forming the double-ended terminal 30 from a sheet of conductive material having a single uniform thickness using conventional metal forming techniques such as stamping and embossing.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A double-ended male blade electrical terminal, comprising:
   a first blade characterized by a substantially uniform first thickness; and
   a second blade having an embossed mesial region that characterizes a substantially uniform second thickness, wherein the second thickness is greater than the first thickness, wherein a leading end of the embossed region proximate a second distal end of the second blade defines a rounded isosceles triangle shape, wherein sides of the embossed region are substantially parallel to sides of the second blade, and wherein a trailing end of the embossed region is characterized as having rounded corners.

2. The electrical terminal in accordance with claim 1, wherein the first thickness is about 0.8 millimeters and the second thickness is about 1.2 millimeters.

3. The electrical terminal in accordance with claim 1, wherein one side of the first blade and one side of the second blade are substantially coplanar.

4. The electrical terminal in accordance with claim 3, wherein the electrical terminal defines a shoulder intermediate the first blade and the second blade, said shoulder having a shoulder width that is greater than a first blade width and a second blade width.

5. The electrical terminal in accordance with claim 4, wherein a first distal end of the first blade and the second distal end of the second blade are beveled.

6. The electrical terminal in accordance with claim 5, wherein two sides of the leading end of the embossed region define a 30 degree angle relative to a longitudinal axis of the electrical terminal.

7. The electrical terminal in accordance with claim 4, wherein the second blade width is greater than the first blade width.

8. A printed circuit board (PCB) assembly, comprising:
   a dielectric substrate;
   a conductive trace disposed upon a surface of the substrate; and
   a double-ended male blade electrical terminal disposed within an aperture defined by the substrate, said electrical terminal comprises:
     a first blade characterized by a substantially uniform first thickness, and
     a second blade having an embossed mesial region that characterizes a substantially uniform second thickness, wherein the second thickness is greater than the first thickness, wherein a leading end of the embossed region proximate a second distal end of the second blade defines a rounded isosceles triangle shape, wherein sides of the embossed region are substantially parallel to sides of the second blade, and wherein a trailing end of the embossed region is characterized as having rounded corners.

9. The PCB assembly in accordance with claim 8, wherein the electrical terminal is not in intimate contact with said conductive trace.

10. The PCB assembly in accordance with claim 8, wherein the first blade protrudes from a first surface of the substrate and the second blade protrudes from a second surface of the substrate opposite the first surface.

11. The PCB assembly in accordance with claim 8, wherein the second blade is configured to be connected to a corresponding socket terminal within an electrical connector and wherein the first blade is configured to be connected to a corresponding socket terminal within an electrical device.

12. The PCB assembly in accordance with claim 11, wherein the electrical device includes a fusible link.

13. The PCB assembly in accordance with claim 11, wherein the electrical device includes an electromechanical relay.

14. A method of manufacturing a double-ended male blade electrical terminal having a first blade characterized by a substantially uniform first thickness and a second blade characterized by a substantially uniform second thickness, wherein the second thickness is greater than the first thickness, said method comprising the steps of:
   forming the double-ended male blade electrical terminal from a sheet of conductive material having the substantially uniform first thickness; and
   embossing a mesial region of the second blade so that the mesial region is characterized by the substantially uniform second thickness, wherein a leading end of the embossed region proximate a second distal end of the second blade defines a rounded isosceles triangle shape, wherein sides of the embossed region are substantially parallel to sides of the second blade, and wherein a trailing end of the embossed region is characterized as having rounded corners.

15. The method in accordance with claim 14, wherein the first thickness is about 0.8 millimeters and the second thickness is about 1.2 millimeters.

16. The method in accordance with claim 14, wherein one side of the first blade and one side of the second blade are substantially coplanar.

17. The method in accordance with claim 16, further comprising the step of forming the electrical terminal to define a shoulder intermediate the first blade and the second blade, said shoulder having a shoulder width that is greater than a first blade width and a second blade width.

18. The method in accordance with claim 17, further comprising the steps of: beveling a first distal end of the first blade and the second distal end of the second blade; embossing a leading end of the embossed region proximate the second distal end to define a rounded isosceles triangle shape; and embossing a trailing end of the embossed region to define a pair of rounded corners, wherein sides of the embossed region are substantially parallel to sides of the second blade.

19. The method in accordance with claim 18, wherein two sides of the leading end of the embossed region define a 30 degree angle relative to a longitudinal axis of the electrical terminal.

20. The method in accordance with claim 17, wherein the second blade width is greater than the first blade width.

* * * * *